United States Patent
Fan et al.

(10) Patent No.: US 12,461,881 B2
(45) Date of Patent: Nov. 4, 2025

(54) DATA SENDING METHOD AND APPARATUS, DATA RECEIVING METHOD AND APPARATUS, DEVICE, AND STORAGE MEDIUM

(71) Applicant: Beijing Volcano Engine Technology Co., Ltd., Beijing (CN)

(72) Inventors: Wentao Fan, Beijing (CN); Haozhong Zhang, Beijing (CN); Yang Zhang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/988,689

(22) Filed: Dec. 19, 2024

(65) Prior Publication Data
US 2025/0265215 A1    Aug. 21, 2025

(30) Foreign Application Priority Data
Feb. 18, 2024   (CN) .......................... 202410179255.2

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC ..................... G06F 13/4221; G06F 2213/0026
See application file for complete search history.

(56) References Cited

U.S. PATENT DOCUMENTS 10,997,106 B1 *   5/2021   Bandaru ............... G06F 13/385
2009/0077276 A1   3/2009   Kato et al.
(Continued)

FOREIGN PATENT DOCUMENTS

| CN | 101393540 A | 3/2009 |
|---|---|---|
| CN | 113377288 A | 9/2021 |

(Continued)

OTHER PUBLICATIONS

China Patent Application No. 202410179255.2; Office Action; dated Mar. 28, 2024; 9 pages.
(Continued)

*Primary Examiner* — Glenn A. Auve
(74) *Attorney, Agent, or Firm* — BakerHostetler

(57) ABSTRACT

A data sending method, a data receiving method and an electronic device are disclosed. At least two data sending requests sent by a server through a high-speed bus are received, where the data sending requests are used to request a smart network interface card to send message data stored on a server to an external device. A corresponding target hardware queue is determined for each data sending request, where a hardware queue is used to communicate with the server through the high-speed bus, target hardware queues corresponding to the data sending requests are distributed in at least two hardware queue groups, and the hardware queue groups are in one-to-one correspondence with the high-speed buses. The target hardware queues communicate with the server through at least two corresponding high-speed buses at the same time to obtain corresponding message data, and send the corresponding message data to the external device.

17 Claims, 6 Drawing Sheets

(56) References Cited

U.S. PATENT DOCUMENTS

| | | | | |
|---|---|---|---|---|
| 2009/0089815 A1* | 4/2009 | Manczak | ............ | G06F 9/45533 |
| | | | | 719/327 |
| 2015/0113114 A1* | 4/2015 | Zhang | ................... | G06F 13/385 |
| | | | | 709/223 |
| 2021/0397559 A1* | 12/2021 | Chen | ................... | G06F 12/0875 |
| 2023/0105771 A1* | 4/2023 | Lu | ........................... | G06F 3/067 |
| | | | | 707/692 |
| 2023/0119437 A1* | 4/2023 | Faasse | .................. | G06F 1/3278 |
| | | | | 713/300 |
| 2023/0153264 A1 | 5/2023 | Lin et al. | | |
| 2023/0205719 A1* | 6/2023 | Zhang | ................. | G06F 13/4282 |
| | | | | 710/316 |
| 2023/0418697 A1* | 12/2023 | Chen | ....................... | G06F 5/065 |

FOREIGN PATENT DOCUMENTS

| | | |
|---|---|---|
| CN | 216623148 U | 5/2022 |
| CN | 114598746 B | 10/2022 |
| CN | 114885045 B | 10/2022 |
| CN | 116303171 A | 6/2023 |
| CN | 116527609 A | 8/2023 |
| CN | 116501684 B | 9/2023 |
| CN | 116743883 A | 9/2023 |
| CN | 117453596 A | 1/2024 |
| CN | 117749739 B | 6/2024 |
| WO | WO 2021/042782 A1 | 3/2021 |

OTHER PUBLICATIONS

European Patent Application No. 24221948.3; Extended Search Report; dated May 28, 2025; 6 pages.
Singapore Patent Application No. 10202404053U; Search Report; dated Jun. 27, 2025; 6 pages.

* cited by examiner

Receiving at least two data receiving requests sent by an external device through a network port, where the data receiving requests are used to request the smart network interface card to store message data sent by the external device in the server — S301

Determining a corresponding target hardware queue for each of the data receiving requests, where a hardware queue is used to communicate with the server through the high-speed bus, target hardware queues corresponding to the data receiving requests are distributed in at least two hardware queue groups, and the hardware queue groups are in one-to-one correspondence with the high-speed buses — S302

Communicating, by the target hardware queues, with the server through at least two corresponding high-speed buses at the same time, to send the message data to the server — S303

Fig. 8

Acquiring second configuration information of the field programmable gate array chip, where the second configuration information is used to characterize a mapping relationship between data pairs and target hardware queues, where the data pair consists of a port identifier of a network port connected to the field programmable gate array chip and a data identifier — S3021

Obtaining the target hardware queue based on processing of the second configuration information, and the data identifier and the port identifier of the network port in the data receiving request — S3022

Fig. 9

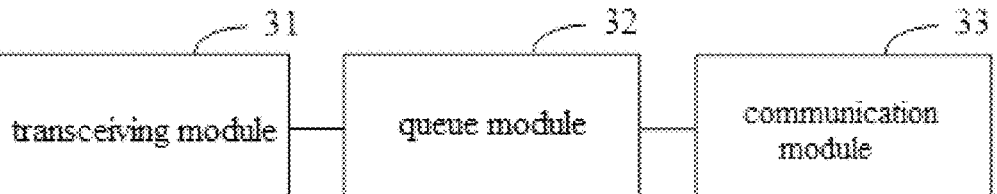

Fig. 10

DATA SENDING METHOD AND APPARATUS, DATA RECEIVING METHOD AND APPARATUS, DEVICE, AND STORAGE MEDIUM

CROSS-REFERENCE TO RELATED APPLICATION

This application claims the priority to Chinese patent application No. 202410179255.2 filed on Feb. 18, 2024, the disclosure of which is incorporated herein in its entirety by reference.

TECHNICAL FIELD

Embodiments of the present disclosure relate to the field of virtual machine technologies, and in particular, to a data sending method and apparatus, a data receiving method and apparatus, a device, and a storage medium.

BACKGROUND

A virtual machine refers to a complete computer system with complete hardware system function simulated by software and running in a completely isolated environment. The virtual machine is created based on resources of a physical server (Host), and therefore, performance of the virtual machine is directly affected by performance of the physical server.

Currently, in order to further improve the performance of the virtual machine, in the prior art, a smart network interface card with a built-in data processing unit (DPU) is mounted to the physical server through a high-speed bus, and processing steps of data communication are offloaded to the smart network interface card for execution, so as to release computing resources of the physical server.

However, in the solutions in the prior art, there is a problem of low data transmission efficiency between the smart network interface card and the server, which affects the data transmission performance of the smart network interface card.

SUMMARY

Embodiments of the present disclosure provide a data sending method and apparatus, a data receiving method and apparatus, a device, and a storage medium to overcome the problem of low data transmission efficiency between a smart network interface card and a server.

In a first aspect, an embodiment of the present disclosure provides a data sending method. The method is applied to a smart network interface card. The smart network interface card has bus ports of at least two high-speed buses. The smart network interface card communicates with a server through the high-speed buses. The method includes:
  receiving at least two data sending requests sent by the server through the high-speed buses, where the data sending requests are used to request the smart network interface card to send message data stored on a side of the server to an external device; determining a corresponding target hardware queue for each of the data sending requests, where a hardware queue is used to communicate with the server through the high-speed bus, target hardware queues corresponding to the data sending requests are distributed in at least two hardware queue groups, and the hardware queue groups correspond to the high-speed buses one by one; and
  communicating, by the target hardware queues, with the server through at least two corresponding high-speed buses at the same time to obtain corresponding message data, and sending the corresponding message data to the external device.

In a second aspect, an embodiment of the present disclosure provides a data receiving method. The method is applied to a smart network interface card. The smart network interface card has bus ports of at least two high-speed buses. The smart network interface card communicates with a server through the high-speed buses. The method includes:
  receiving at least two data receiving requests sent by an external device through a network port, where the data receiving requests are used to request the smart network interface card to store message data sent by the external device in the server; determining a corresponding target hardware queue for each of the data receiving requests, where a hardware queue is used to communicate with the server through the high-speed bus, target hardware queues corresponding to the data receiving requests are distributed in at least two hardware queue groups, and the hardware queue groups correspond to the high-speed buses one by one; and
  communicating, by the target hardware queues, with the server through at least two corresponding high-speed buses at the same time, to send the message data to the server.

In a third aspect, an embodiment of the present disclosure provides a data sending apparatus. The apparatus is applied to a smart network interface card. The smart network interface card has bus ports of at least two high-speed buses. The smart network interface card communicates with a server through the high-speed buses. The apparatus includes:
  a transceiving module, configured to receive at least two data sending requests sent by the server through the high-speed buses, where the data sending requests are used to request the smart network interface card to send message data stored on a side of the server to an external device;
  a queue module, configured to determine a corresponding target hardware queue for each of the data sending requests, where a hardware queue is used to communicate with the server through the high-speed bus, target hardware queues corresponding to the data sending requests are distributed in at least two hardware queue groups, and the hardware queue groups correspond to the high-speed buses one by one; and
  a communication module, configured to communicate, by the target hardware queues, with the server through at least two corresponding high-speed buses at the same time to obtain corresponding message data, and send the corresponding message data to the external device.

In a fourth aspect, an embodiment of the present disclosure provides a data receiving apparatus. The apparatus is applied to a smart network interface card. The smart network interface card has bus ports of at least two high-speed buses. The smart network interface card communicates with a server through the high-speed buses. The apparatus includes:
  a communication module, configured to receive at least two data receiving requests sent by an external device through a network port, where the data receiving requests are used to request the smart network interface card to store message data sent by the external device in the server;

a queue module, configured to determine a corresponding target hardware queue for each of the data receiving requests, where a hardware queue is used to communicate with the server through the high-speed bus, target hardware queues corresponding to the data receiving requests are distributed in at least two hardware queue groups, and the hardware queue groups correspond to the high-speed buses one by one; and a transceiving module, configured to communicate, by the target hardware queues, with the server through at least two corresponding high-speed buses at the same time, to send the message data to the server.

In a fifth aspect, an embodiment of the present disclosure provides an electronic device. The electronic device includes: a processor and a memory;

where the memory stores computer executable instructions; and the processor executes the computer executable instructions stored in the memory so as to perform the data sending method according to the first aspect and various possible designs of the first aspect, or perform the data receiving method according to the second aspect and various possible designs of the second aspect.

In a sixth aspect, an embodiment of the present disclosure provides a computer-readable storage medium. The computer-readable storage medium stores computer executable instructions. When a processor executes the computer executable instructions, the processor performs the data sending method according to the first aspect and various possible designs of the first aspect, or performs the data receiving method according to the second aspect and various possible designs of the second aspect.

In a seventh aspect, an embodiment of the present disclosure provides a computer program product, including a computer program, where when the computer program is executed by a processor, the processor performs the data sending method according to the first aspect and various possible designs of the first aspect, or performs the data receiving method according to the second aspect and various possible designs of the second aspect.

BRIEF DESCRIPTION OF DRAWINGS

In order to more clearly illustrate the technical solutions in the embodiments of the present disclosure or in the prior art, the drawings that need to be used in the description of the embodiments or the prior art will be briefly introduced in the following. Obviously, the drawings in the following description are some embodiments of the present disclosure. For those of ordinary skill in the art, other drawings can be obtained based on these drawings without creative efforts.

FIG. 8 is a first schematic flowchart of a data receiving method according to an embodiment of the present disclosure;

FIG. 9 is a flowchart of a specific implementation of step S302 in the embodiment shown in FIG. 8;

FIG. 10 is a structural block diagram of a data sending apparatus according to an embodiment of the present disclosure;

DETAILED DESCRIPTION

In order to make the objectives, technical solutions, and advantages of the embodiments of the present disclosure clearer, the technical solutions in the embodiments of the present disclosure will be described clearly and completely below with reference to the drawings in the embodiments of the present disclosure. Obviously, the described embodiments are part of the embodiments of the present disclosure, but not all of the embodiments. Based on the embodiments in the present disclosure, all other embodiments obtained by those of ordinary skill in the art without creative efforts fall within the protection scope of the present disclosure.

It should be noted that user information (including but not limited to user equipment information, user personal information, etc.) and data (including but not limited to data for analysis, stored data, data for display, etc.) involved in the present disclosure are information and data authorized by users or fully authorized by parties, and the collection, use, and processing of related data need to comply with relevant laws, regulations, and standards of relevant countries and regions, and corresponding operation entry are provided for users to choose authorization or rejection.

The application scenarios of the embodiments of the present disclosure are explained below.

Figure 1:
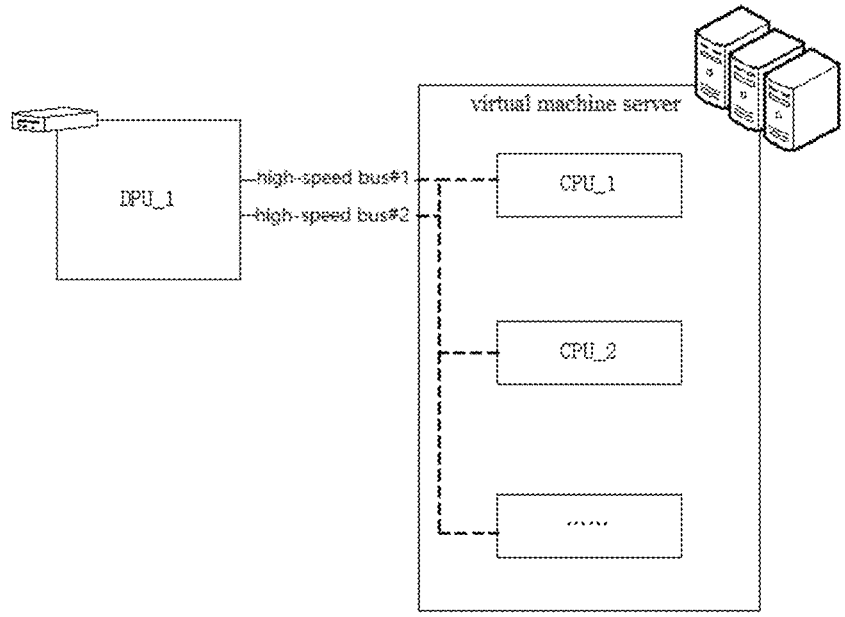
FIG. 1 is a diagram of an application scenario of a data sending method according to an embodiment of the present disclosure.

FIG. 1 is a diagram of an application scenario of a data sending method according to an embodiment of the present disclosure. The data sending method provided in the embodiments of the present disclosure may be applied to a data communication scenario between a data processing unit (DPU) and a virtual machine server. The data processing unit may be a smart network interface card, which is mounted on the virtual machine server and configured to process network communication data between the virtual machine server and an external device (such as another network interface card), thereby reducing the computing load of the virtual machine server. In this process, the smart network interface card and the server are connected through a high-speed bus for data transmission. When the smart network interface card is connected to the virtual machine server as an elastic network interface card, one smart network interface card communicates with one or more central processing units (CPU) in the virtual machine server through the high-speed bus. For example, as shown in the figure, a smart network interface card DPU_1 communicates with the virtual machine server through a high-speed bus #1 to transmit message data of a central processing unit CPU_1 and a central processing unit CPU_2 in the virtual machine server. In this case, since the smart network interface card receives the traffic from the virtual machine server or sends the traffic to the virtual machine server based on the corresponding bus, the data transmission bandwidth of the smart network interface card is also directly limited by the bandwidth of the high-speed bus.

However, in some related technologies, some high-specification smart network interface cards provide a plurality of high-speed bus interfaces, for example, further including a high-speed bus #2 shown in the figure. After being mounted to high-speed bus channels under a corresponding central processing unit on a server, theoretically higher network bandwidth can be achieved. However, in the solutions in the prior art, due to a fixed configuration strategy adopted for the smart network interface card, when the smart network interface card communicates with the virtual machine server, only one high-speed bus can be used (for example, only through the high-speed bus #1) for data transmission, thereby resulting in a limited upper limit of the outbound bandwidth of the smart network interface card, which affects the data transmission efficiency between the smart network interface card and the virtual machine server.

Embodiments of the present disclosure provide a data sending method and a data receiving method to solve the above problem.

Figure 2:
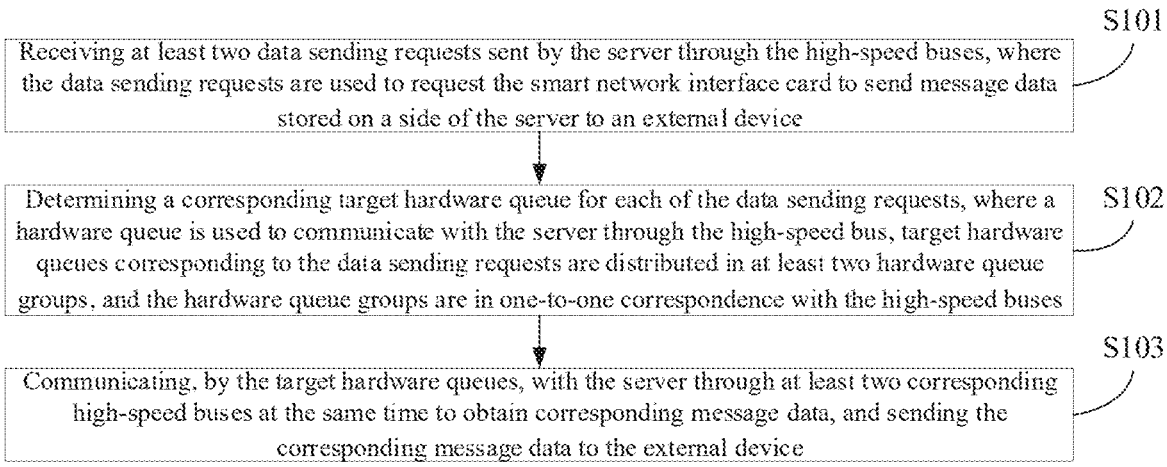
FIG. 2 is a first schematic flowchart of a data sending method according to an embodiment of the present disclosure.

Referring to FIG. 2, FIG. 2 is a first schematic flowchart of a data sending method according to an embodiment of the present disclosure, which corresponds to a process of sending data to an external device through a smart network interface card by a virtual machine server (hereinafter referred to as a server). The method in this embodiment may be applied in the smart network interface card. The smart network interface card has bus ports of at least two high-speed buses, and the smart network interface card communicates with the server through the high-speed buses. The data sending method includes the following steps.

Step S101: receiving at least two data sending requests sent by the server through the high-speed buses, where the data sending requests are used to request the smart network interface card to send message data stored on a side of the server to an external device.

Figure 3:
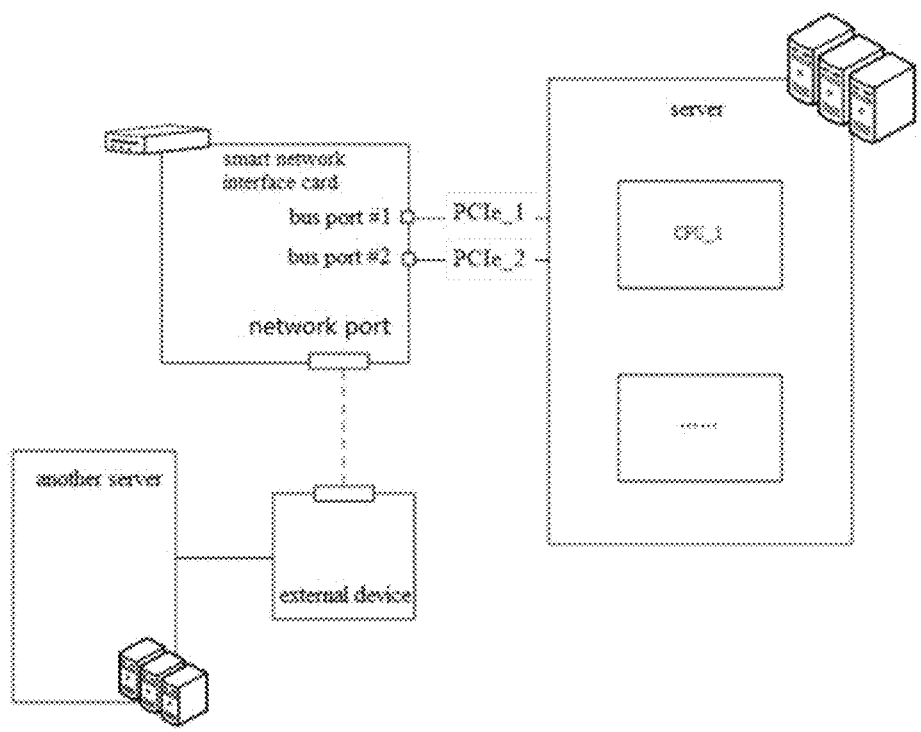
FIG. 3 is a schematic diagram of a connection relationship between a smart network interface card and a server according to an embodiment of the present disclosure.

Exemplarily, FIG. 3 is a schematic diagram of a connection relationship between a smart network interface card and a server according to an embodiment of the present disclosure. As shown in FIG. 3, the smart network interface card has two bus ports of high-speed buses, for example, bus port #1 and bus port #2 respectively as shown in the figure. The smart network interface card establishes high-speed bus connections with the server through the bus port #1 and the bus port #2. The high-speed bus is, for example, PCIe (peripheral component interconnect express). Correspondingly, the smart network interface card and the server are connected through two high-speed buses, PCIe_1 and PCIe_2. One or more central processing units such as a CPU_1 are provided in the server. On the other hand, the smart network interface card also has a network port. The network port is, for example, an optical module port. The smart network interface card communicates with other devices through the network port, for example, communicates with an external device mounted on another server, where the external device may be a switch connected to another server, or a smart network interface card installed on another server, thereby implementing data communication between the current server and another server.

Referring to the schematic structural diagram of the smart network interface card, the smart network interface card has the bus ports of at least two high-speed buses, and therefore can communicate with the server through at least two high-speed buses. For the smart network interface card with such features, when data is sent to an external device through the smart network interface card, first, the smart network interface card will receive data sending requests sent by the server through the high-speed bus, where the data sending requests are used to request the smart network interface card to send message data stored on a side of the server to the external device. In a possible implementation, the high-speed bus used by the server to send the data sending request to the smart network interface card is fixed, that is, a target high-speed bus corresponding to the smart network interface card. Exemplarily, the target high-speed bus (a bus identifier thereof) can be determined based on a network interface card identifier of the smart network interface card. The step of determining the bus identifier of the target high-speed bus may be performed by the server after it detects that the smart network interface card is installed. On the other hand, after the smart network interface card is installed on the server, the corresponding target high-speed bus is determined based on the port identifier of the bus port on the side of the server into which the smart network interface card is inserted, and the data sending request sent by the server is obtained based on the target high-speed bus.

Step S102: determining a corresponding target hardware queue for each of the data sending requests, where a hardware queue is used to communicate with the server through the high-speed bus, target hardware queues corresponding to the data sending requests are distributed in at least two hardware queue groups, and the hardware queue groups are in one-to-one correspondence with the high-speed buses.

Step S103: communicating, by the target hardware queues, with the server through at least two corresponding high-speed buses at the same time to obtain corresponding message data, and sending the corresponding message data to the external device.

Further, the message data is stored on a side of the server. After receiving the data sending request, the smart network interface card responds to the data sending request to obtain the above message data from the server, processes the message data, and sends the message data to the external device. For example, first, when the smart network interface card obtains data from the server or sends data to the server through the high-speed bus, a hardware queue provided in the smart network interface card is used for implementation. The hardware queue is a queue structure provided by the smart network interface card for executing a data transmission task, and a specific implementation form of the hardware queue is related to hardware design of the smart network interface card, which will not be described in detail in this embodiment.

Further, each high-speed bus corresponds to a group of hardware queues, that is, a hardware queue group, and each hardware queue group contains the same number (or different numbers) of hardware queues. After receiving the data sending request, the smart network interface card determines, according to content in the data sending request, a target hardware queue for processing the corresponding message data, and the target hardware queue executes a corresponding data request task to obtain the message data from the side of the server through the corresponding high-speed bus.

Figure 4:
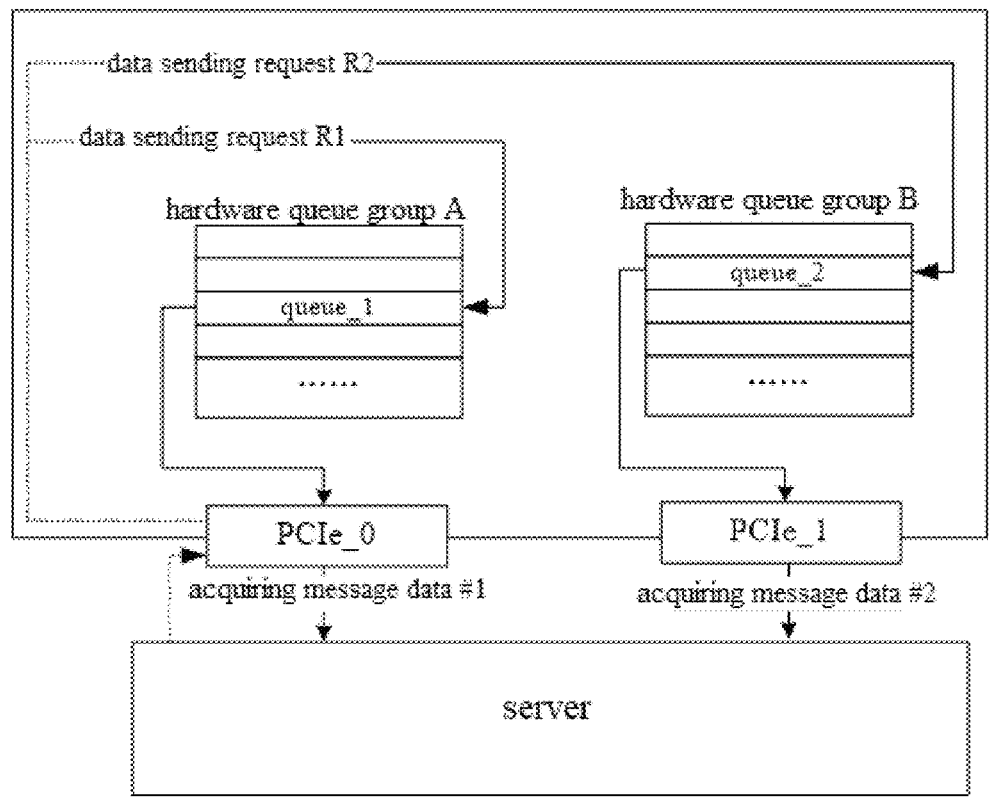
FIG. 4 is a schematic diagram of a hardware queue according to an embodiment of the present disclosure.

FIG. 4 is a schematic diagram of a hardware queue according to an embodiment of the present disclosure. As shown in FIG. 4, exemplarily, a smart network interface card has two bus ports of high-speed buses, which correspond to a high-speed bus PCIe_0 and a high-speed bus PCIe_1 respectively, and the smart network interface card communicates with a server through the high-speed bus PCIe_0 and the high-speed bus PCIe_1. On this basis, each bus corresponds to one hardware queue group, that is, the high-speed bus PCIe_0 corresponds to a hardware queue group A, and the high-speed bus PCIe_1 corresponds to a hardware queue group B. The hardware queue group A and the hardware queue group B respectively contain 32 hardware queues for executing data communication tasks. When the smart network interface card receives at least two data sending requests sent by the server, such as a data sending request R1 and a data sending request R2, the data sending request R1 and the data sending request R2 may be received by the smart network interface card successively or simultaneously. After that, the smart network interface card maps the data sending request R1 to a certain hardware queue in the hardware queue group A, such as queue_1 shown in the figure, and maps the data sending request R2 to a certain hardware queue in the hardware queue group B, such as queue_2 shown in the figure. After that, the message data #1 is obtained from the server by queue_1 through the high-speed bus PCIe_0, and the message data #2 is obtained from the server by queue_2 through the high-speed bus PCIe_1. The above process may be performed asynchronously without interfering with each other. Therefore, the smart network interface card can achieve the purpose of obtaining data from the server through the high-speed bus PCIe_0 and the high-speed bus PCIe_1 at the same time, that is, the purpose of simultaneously using the data bandwidths of multiple high-speed buses and improving the data transmission performance of the smart network interface card with multiple high-speed bus ports.

Then, the message data obtained in the above steps, such as the message data #1 and the message data #2, is sent to the external device through the network port of the smart network interface card, so that the external device receives the message data, and the process of sending data from the server to the external device is completed. The external device may be a smart network interface card mounted on or built in another server, which is similar to the smart network interface card mentioned in this embodiment, or may be another electronic device with a data forwarding function, which is not limited here.

In this embodiment, at least two data sending requests sent by the server through the high-speed bus are received, where the data sending requests are used to request the smart network interface card to send the message data stored on the side of the server to the external device; the corresponding target hardware queue is determined for each data sending request, where the hardware queue is used to communicate with the server through the high-speed bus, the target hardware queues corresponding to the data sending requests are distributed in at least two hardware queue groups, and the hardware queue groups are in one-to-one correspondence with the high-speed buses; and the target hardware queues communicate with the server through at least two corresponding high-speed buses at the same time to obtain the corresponding message data, and send the corresponding message data to the external device. The target hardware queues distributed in different hardware queue groups corresponding to the data sending requests are determined, and the synchronous data transmission of at least the high-speed buses is achieved through the target hardware queues, so that the bandwidth resources of the smart network interface card are fully utilized, the data transmission efficiency between the smart network interface card and the server is improved, and the data transmission performance of the smart network interface card is improved.

Figure 5:
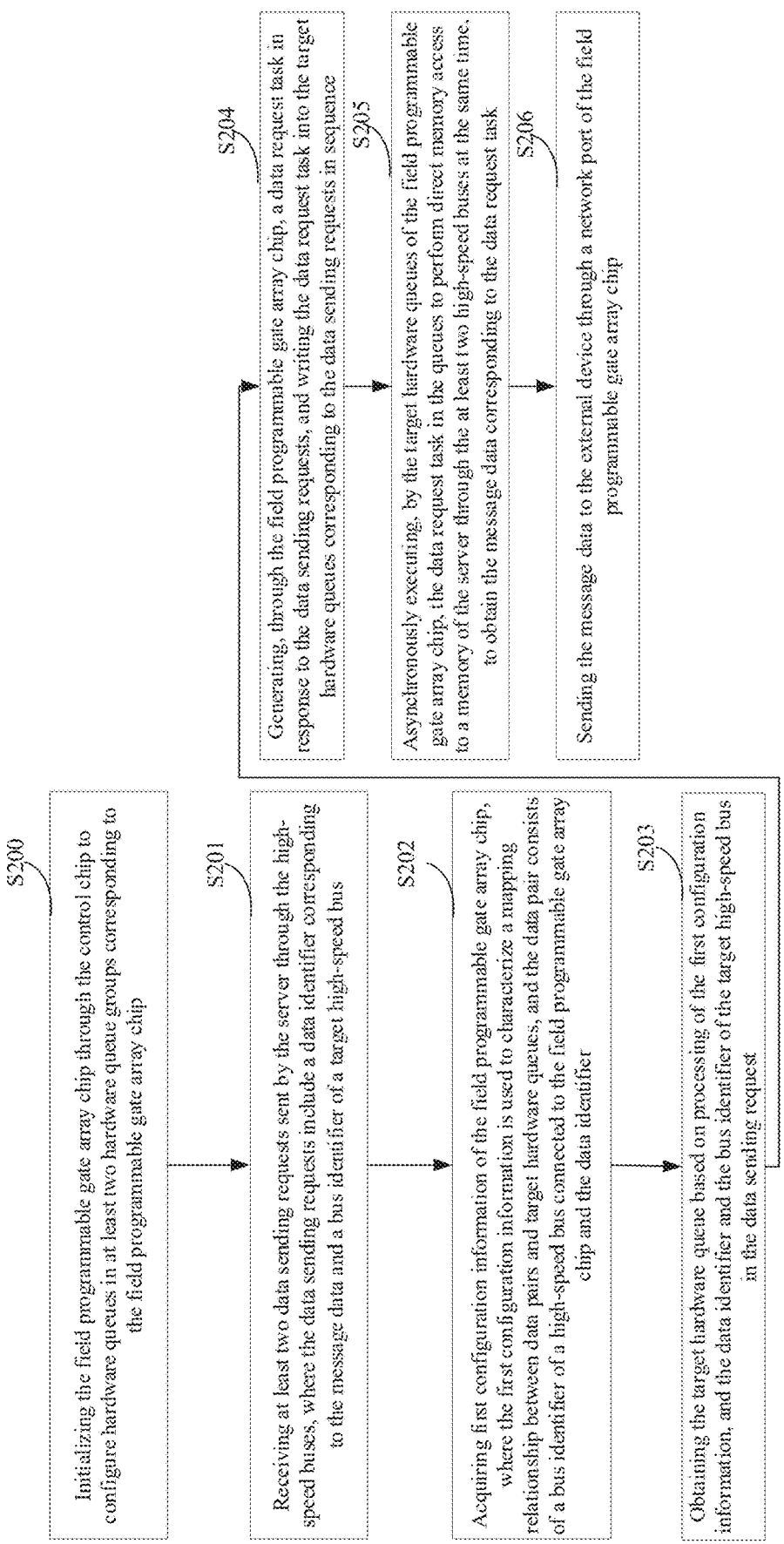
FIG. 5 is a second schematic flowchart of a data sending method according to an embodiment of the present disclosure.

Referring to FIG. 5, FIG. 5 is a second schematic flowchart of a data sending method according to an embodiment of the present disclosure. On the basis of the embodiment shown in FIG. 2, this embodiment further refines steps S102-S103 and adds a step of configuring the smart network interface card. Exemplarily, a field programmable gate array chip is provided inside the smart network interface card, and the field programmable gate array chip is connected to the high-speed bus and provides hardware queue groups in one-to-one correspondence with the high-speed buses. The data sending method includes the following steps.

Step S201: receiving at least two data sending requests sent by the server through the high-speed buses, where the data sending requests include a data identifier corresponding to the message data and a bus identifier of a target high-speed bus.

Step S202: acquiring first configuration information of the field programmable gate array chip, where the first configuration information is used to characterize a mapping relationship between data pairs and target hardware queues, and the data pair consists of a bus identifier of a high-speed bus connected to the field programmable gate array chip and a data identifier.

Step S203: obtaining the target hardware queue based on processing of the first configuration information, and the data identifier and the bus identifier of the target high-speed bus in the data sending request.

Exemplarily, first, after receiving the data sending request sent by the server, the smart network interface card identifies the data sending request to obtain the data identifier and the bus identifier in the data sending request. The data identifier is description information for the message data to be sent, and the data identifier may be a predefined identifier. The smart network interface card can implement positioning of the message data to be sent through the data identifier, for example, determine an address of the message data to be sent in the memory of the server. The bus identifier is description information for a bus port of the high-speed bus used by the smart network interface card, that is, information indicating the high-speed bus port of the server into which the smart network interface card is plugged. After obtaining the above information through the data sending request, the smart network interface card performs mapping through the above information to determine the corresponding target hardware queue.

Further, in a possible implementation, a field programmable gate array (FPGA) chip is provided inside the smart network interface card. The field programmable gate array chip has two or more high-speed bus ports, and can use two or more high-speed buses (for example, PCIe) to communicate with the server at the same time. The field programmable gate array chip can provide hardware queues (Front end queue, FEQ) corresponding to the high-speed buses. After being configured, the field programmable gate array chip has first configuration information, and the first configuration information is used to characterize a mapping relationship between data pairs and target hardware queues, where the data pair consists of a bus identifier of a high-speed bus connected to the field programmable gate array chip and a data identifier. For example, there may be:

[Tag_1,data]→queue where Tag_1 represents the bus identifier of the high-speed bus, data represents the data identifier of the message data, and queue is the corresponding target hardware queue. In a specific implementation, the field programmable gate array chip receives the data sending request, and after processing the data sending request based on the first configuration information, a target hardware queue is determined. After that, the field programmable gate array chip obtains the corresponding message data through the target hardware queue.

Step S204: generating, through the field programmable gate array chip, a data request task in response to the data sending request, and writing the data request task into the target hardware queues corresponding to the data sending requests in sequence.

Step S205: asynchronously executing, by the target hardware queues of the field programmable gate array chip, the data request task in the queues to perform direct memory access to a memory of the server through the at least two high-speed buses at the same time, to obtain the message data corresponding to the data request task.

Exemplarily, on the other hand, the field programmable gate array chip generates a corresponding data request task according to the data sending request. The data request task, after being executed, is used to obtain message data from a side of the server. For example, direct memory access (DMA) is performed on the memory of the server to obtain the message data. After generating the corresponding data request task based on the data sending request, the field programmable gate array chip writes the data request task into the target hardware queue for execution according to the target hardware queue (a queue identifier thereof) determined in the above steps. Since the time taken for the field programmable gate array chip to obtain the data sending request and generate the corresponding data request task is relatively short, while the time taken for executing the data request task is relatively long, the data request task is generally executed by queuing through the target hardware queue. At the same time, since the target hardware queues belong to at least two hardware queue groups and correspond to at least two high-speed buses, data can be transmitted in parallel through at least two high-speed buses at the same time, that is, direct memory access is performed on the memory of the server through at least two high-speed buses at the same time, thereby obtaining the message data corresponding to the data request task, and achieving the purpose of improving the utilization of the bus bandwidth.

Step S206: sending the message data to the external device through a network port of the field programmable gate array chip.

Exemplarily, after the message data is obtained through the field programmable gate array chip, the message data can be further forwarded to the external device that also has the network port through the network port of the field programmable gate array chip, thereby implementing forwarding of the message data. The external device has been described in the previous embodiments, which will not be repeated here.

Optionally, the above first configuration information and other information are pre-configured in the smart network interface card. Therefore, in order to implement the above steps, a step of configuring the smart network interface card is further included before step S201. Exemplarily, the smart network interface card further includes a control chip connected to the field programmable gate array chip. Before step S201, the following step is further included.

Step S200: initializing the field programmable gate array chip through the control chip to configure hardware queues in at least two hardware queue groups corresponding to the field programmable gate array chip.

Figure 6:
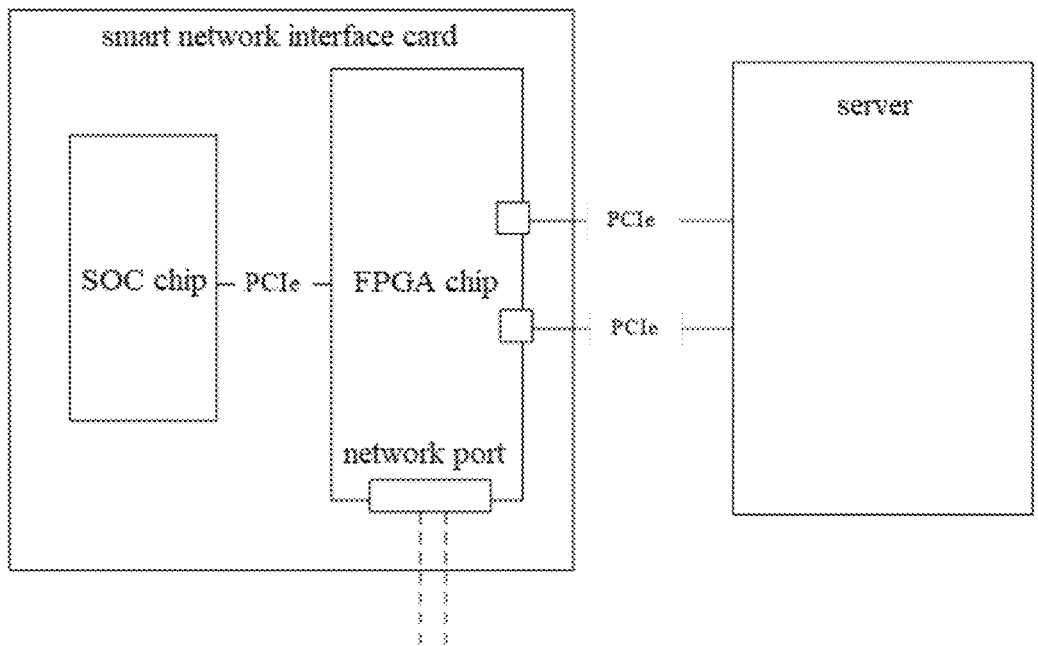
FIG. 6 is a schematic structural diagram of a smart network interface card according to an embodiment of the present disclosure.

FIG. 6 is a schematic structural diagram of a smart network interface card according to an embodiment of the present disclosure. As shown in FIG. 6, the smart network interface card includes a field programmable gate array (FPGA) chip and a control chip connected thereto. The control chip may be a System on Chip (SOC). The field programmable gate array chip and the control chip may be connected through a high-speed bus interface (PCIe). For example, the FPGA chip includes a plurality of hardware channels, a high-speed bus interface (PCIe) and a network interface. In addition, the FPGA chip also provides a plurality of modules including modules functioned as parsing, processing, sending, and receiving data, etc. On the SoC chip, units functioned as device emulation, network data processing, and stored data processing, etc., are included. In addition, functions such as management and control of a docking data center (server), overall monitoring of a DPU (smart network interface card), and server BMC management are also processed through the SoC chip.

Further, in the initialization stage of the smart network interface card, the control chip configures the field programmable gate array chip, for example, the first configuration information in the steps of the above embodiment, and configures the arrangement and distribution of the hardware queues in the hardware queue group provided by the field programmable gate array chip, so that when the field programmable gate array chip responds to the data sending request, the corresponding data request task can be evenly written into the corresponding target hardware queue, that is, the rationality of the determined target hardware queue is improved, and load balance among multiple high-speed buses is achieved.

Figure 7:
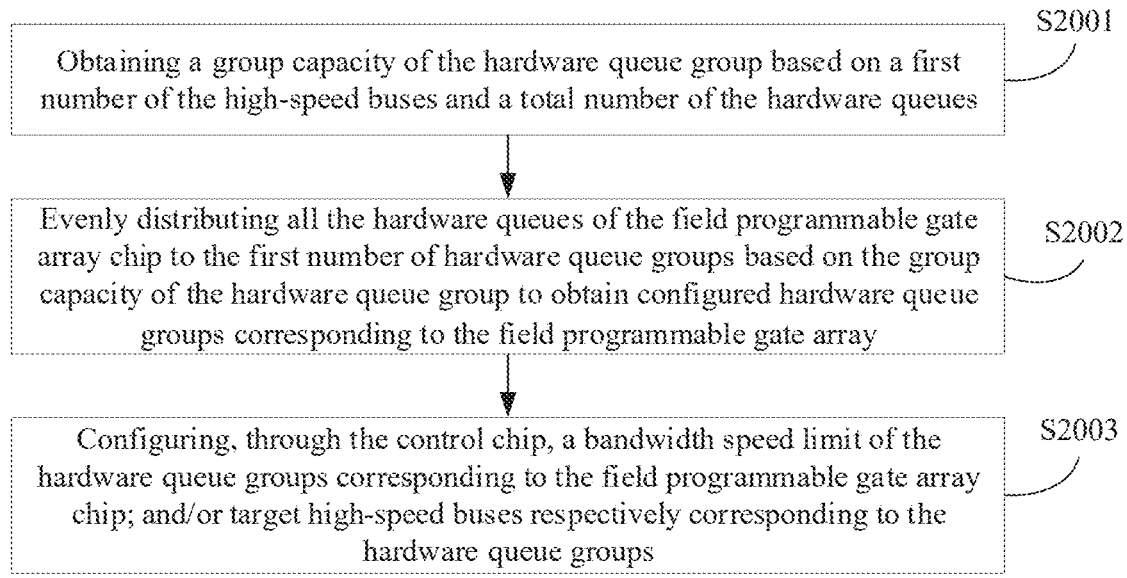
FIG. 7 is a flowchart of a specific implementation of step S200.

Exemplarily, as shown in FIG. 7, the specific implementation of step S200 includes the following steps.

Step S2001: obtaining a group capacity of the hardware queue group based on a first number of the high-speed buses and a total number of hardware queues.

Step S2002: evenly distributing all the hardware queues of the field programmable gate array chip to the first number of hardware queue groups based on the group capacity of the hardware queue group to obtain configured hardware queue groups corresponding to the field programmable gate array.

Exemplarily, the high-speed buses provided by the field programmable gate array chip are fixed. In a possible implementation, the field programmable gate array chip provides a fixed number of hardware queues, that is, a total number of queues. After that, the field programmable gate array chip has more than two bus ports of high-speed buses, that is, corresponding to at least two high-speed buses. The field programmable gate array chip determines the number of hardware queues corresponding to each high-speed bus, that is, a group capacity of the hardware queue group, based on a first number of the high-speed buses, that is, the first number, and the total number of queues. For example, if the total number of queues is 128 and the number of high-speed buses is 2, the group capacity of the corresponding hardware queue group is 64. After that, the hardware queues are evenly distributed to the first number of hardware queue groups based on the group capacity, to obtain configured hardware queue groups corresponding to the field programmable gate array chip. For example, a set of queue identifiers of all the hardware queues provided by the field programmable gate array chip is [0, 1, 2, 3, . . . , 127], and the number of high-speed buses is 2 (the first number), then the number of corresponding hardware queue groups is 2, and the group capacity of each hardware queue group is 64. The hardware queues are evenly distributed to the two hardware queue groups, and the first hardware queue group is obtained as [0, 2, 4, 6, . . . , 126], and the second hardware queue group is obtained as [1, 3, 5, 7, . . . , 127]. After that, the corresponding first configuration information is generated based on the above two hardware queue groups.

For example, in order to break through the limitation of physical bandwidth of a single PCIe, the smart network interface card is supported to divide its own queues into two parts for configuration. For a smart network interface card with 32 logical queues, the 0th, 2nd, 4th, . . . , and 30th logical queues are divided into the first group, and the 1st, 3rd, 5th, . . . , and 31st queues are divided into the second group. The configuration of the first group of queues uses the hardware queue of the FPGA under the PCIe where the device is located. The configuration of the second group of queues uses the hardware queue under another PCIe connected to the FPGA. In order to pass the verification of the request ID by the PCIe Root Complex, the second group of queues needs to be configured with the device ID of the PCIe_1 (that is, the PCIe corresponding to the first group of queues) as the request ID, which is used when sending the DMA request to the server.

In the steps of this embodiment, load balance in a subsequent data transmission process is achieved by configuring the hardware queue of the field programmable gate array in the initialization stage, thereby improving the overall efficiency when multiple high-speed buses transmit data in parallel.

Optionally, step S200 further includes the following step.

Step S2003: configuring, through the control chip, a bandwidth speed limit of the hardware queue groups corresponding to the field programmable gate array chip; and/or target high-speed buses respectively corresponding to the hardware queue groups.

Exemplarily, on the basis of the above steps, the control chip may further configure the bandwidth speed limit of the hardware queue groups corresponding to the field programmable gate array chip. This process may occur in the initialization stage or other stages after the initialization, which is not limited here. Since the hardware queue groups are in one-to-one correspondence with the high-speed buses, the bandwidth speed limit is also a limitation on the high-speed buses. For example, the bandwidth speed limit for each hardware queue group is limited to 80 Gbps, and if the field programmable gate array chip provides two hardware queue groups, that is, it is connected to two high-speed buses, the maximum bandwidth that can be provided by the smart network interface card is 160 Gbps.

Exemplarily, the control chip may further configure the target high-speed buses respectively corresponding to the hardware queue groups corresponding to the field programmable gate array chip, so that the hardware queues in the hardware queue group can be mapped to any high-speed bus configured by the control chip, thereby improving the flexibility and expandability in the use process of the smart network interface card. This process may occur in the initialization stage or other stages after the initialization, which is not limited here.

In this embodiment, the implementation of step S201 is the same as the implementation of step S101 in the embodiment shown in FIG. 2 of the present disclosure, and will not be repeated here.

FIG. 8 is a first schematic flowchart of a data receiving method according to an embodiment of the present disclosure, which corresponds to a process of sending data to a server through a smart network interface card by an external device. The method in this embodiment may be applied in the smart network interface card. The smart network interface card has bus ports of at least two high-speed buses, and the smart network interface card communicates with the server through the high-speed buses. The data receiving method includes the following steps.

Step S301: receiving at least two data receiving requests sent by an external device through a network port, where the data receiving requests are used to request the smart network interface card to store message data sent by the external device in the server.

Step S302: determining a corresponding target hardware queue for each of the data receiving requests, where a hardware queue is used to communicate with the server through the high-speed bus, target hardware queues corresponding to the data receiving requests are distributed in at least two hardware queue groups, and the hardware queue groups are in one-to-one correspondence with the high-speed buses.

Step S303: communicating, by the target hardware queues, with the server through at least two corresponding high-speed buses at the same time, to send the message data to the server.

Exemplarily, referring to the data sending method in the process of sending the message data to the external device through the smart network interface card by the server as shown in FIG. 2 to FIG. 7, the data receiving method provided in this embodiment is equivalent to a reverse data transmission solution corresponding to the above data sending method. In the process of transmitting the message data from the external device to the server, the target hardware queue still needs to be used to achieve the purpose of communicating with the server through two high-speed buses at the same time. Related concepts of the hardware queue and the hardware queue group are consistent with the corresponding concepts in the embodiments shown in FIG. 2 to FIG. 7, and will not be repeated here.

Further, the data receiving method provided in this embodiment may occur before or after the data sending method provided in the embodiments shown in FIG. 2 to FIG. 7, which is not limited here. In order to more clearly illustrate the solution of this embodiment, the data receiving method provided in this embodiment is introduced below with reference to the case where the data receiving method provided in this embodiment is executed after the data sending method provided in the embodiments shown in FIG. 2 to FIG. 7 is executed, by way of example.

Exemplarily, after receiving the data receiving request sent by the external device, the smart network interface card processes the data to determine the corresponding target hardware queue. Further, in a possible implementation, a field programmable gate array chip and a control chip are provided inside the smart network interface card, the field programmable gate array chip is connected to the high-speed bus and the network port and provides a hardware queue group in one-to-one correspondence with the high-speed bus, and the data receiving request includes a data identifier corresponding to the message data and a port identifier of the network port. As shown in FIG. 9, the specific implementation of step S302 includes the following steps.

Step S3021: acquiring second configuration information of the field programmable gate array chip, where the second configuration information is used to characterize a mapping relationship between data pairs and target hardware queues, where the data pair consists of a port identifier of a network port connected to the field programmable gate array chip and a data identifier.

Step S3022: obtaining the target hardware queue based on processing of the second configuration information, and the data identifier and the port identifier of the network port in the data receiving request.

Exemplarily, the second configuration information is similar to the first configuration information in the previous embodiment, and may be generated after the field programmable gate array chip is configured by the control chip in the initialization stage of the smart network interface card. The second configuration information is used to characterize a mapping relationship between data pairs and target hardware queues, where the data pair consists of a port identifier of a network port connected to the field programmable gate array chip and a data identifier, that is:

[Tag_2,data]→queue, where Tag_2 represents the port identifier of the network port, data represents the data identifier of the message data or the message data itself, and queue is the corresponding target hardware queue. In a specific implementation, the field programmable gate array chip receives the data receiving request, and after processing the data receiving request based on the second configuration information, a target hardware queue is determined.

After that, the field programmable gate array chip sends the corresponding message data to the server through the target hardware queue. For example, the field programmable gate array chip uses the target hardware queue to communicate with the server through at least two corresponding high-speed buses at the same time, to store the message data in a buffer of the server, so as to achieve the purpose of transmitting data through multiple high-speed buses at the same time and improve the data sending efficiency when sending the message data to the server. For the specific generation process of the second configuration information, reference may be made to the generation process of the first configuration information, which will not be repeated here.

Optionally, this embodiment further includes the following steps.

Generating, through the field programmable gate array chip, a data receiving task in response to the data receiving request, and writing the data receiving task into the target hardware queues corresponding to the data receiving requests in sequence.

Optionally, the communicating, by the target hardware queues, with the server through at least two corresponding high-speed buses at the same time, to send the message data to the server includes: asynchronously executing, by the target hardware queues of the field programmable gate array chip, the data receiving task in the queue to write the message data into the message buffer of the server through at least two high-speed buses at the same time.

Optionally, the smart network interface card further includes a control chip connected to the field programmable gate array chip, and the method further includes: initializing the field programmable gate array chip through the control chip to configure hardware queues in at least two hardware queue groups corresponding to the field programmable gate array chip.

Optionally, the initializing the field programmable gate array chip through the control chip to configure hardware queues in at least two hardware queue groups corresponding to the field programmable gate array chip includes: obtaining a group capacity of the hardware queue group based on a first number of the high-speed buses and a total number of hardware queues; and evenly distributing all the hardware queues of the field programmable gate array chip to the first number of hardware queue groups based on the group capacity of the hardware queue group to obtain configured hardware queue groups corresponding to the field programmable gate array.

Optionally, the method further includes: configuring, through the control chip, a bandwidth speed limit of the hardware queue groups corresponding to the field programmable gate array chip; and/or target high-speed buses respectively corresponding to the hardware queue groups.

Corresponding to the data sending method in the above embodiment, FIG. 10 is a structural block diagram of a data sending apparatus according to an embodiment of the present disclosure. For ease of illustration, only parts related to the embodiments of the present disclosure are shown. Referring to FIG. 10, exemplarily, a data sending apparatus 3 is applied to a smart network interface card. The smart network interface card has bus ports of at least two high-speed buses. The smart network interface card communicates with a server through the high-speed buses. The data sending apparatus 3 includes a transceiving module 31, a queue module 32, and a communication module 33.

The transceiving module 31 is configured to receive at least two data sending requests sent by the server through the high-speed buses, where the data sending requests are used to request the smart network interface card to send message data stored on a side of the server to an external device.

The queue module 32 is configured to determine a corresponding target hardware queue for each of the data sending requests, where a hardware queue is used to communicate with the server through the high-speed bus, target hardware queues corresponding to the data sending requests are distributed in at least two hardware queue groups, and the hardware queue groups are in one-to-one correspondence with the high-speed buses.

The communication module 33 is configured to communicate, by the target hardware queues, with the server through at least two corresponding high-speed buses at the same time to obtain corresponding message data, and send the corresponding message data to the external device.

According to one or more embodiments of the present disclosure, a field programmable gate array chip is provided inside the smart network interface card, the field programmable gate array chip is connected to the high-speed buses and provides hardware queue groups in one-to-one correspondence with the high-speed buses, and the data sending requests include a data identifier corresponding to the message data and a bus identifier of a target high-speed bus. The queue module 32 may be configured to: acquire first configuration information of the field programmable gate array chip, where the first configuration information is used to characterize a mapping relationship between data pairs and target hardware queues, where the data pair consists of a bus identifier of a high-speed bus connected to the field programmable gate array chip and a data identifier; and obtain the target hardware queue based on processing of the first configuration information, and the data identifier and the bus identifier of the target high-speed bus in the data sending request.

According to one or more embodiments of the present disclosure, the queue module 32 is further configured to: generate, through the field programmable gate array chip, a data request task in response to the data sending request, and write the data request task into the target hardware queues corresponding to the data sending requests in sequence. The communication module 33 may be configured to: asynchronously execute, by the target hardware queues of the field programmable gate array chip, the data request task in the queues to perform direct memory access to a memory of the server through the at least two high-speed buses at the same time, to obtain the message data corresponding to the data request task.

According to one or more embodiments of the present disclosure, the smart network interface card further includes a control chip connected to the field programmable gate array chip. The queue module 32 may be configured to: initialize the field programmable gate array chip through the control chip to configure hardware queues in at least two hardware queue groups corresponding to the field programmable gate array chip.

According to one or more embodiments of the present disclosure, when initializing the field programmable gate array chip through the control chip to configure the hardware queues in the at least two hardware queue groups corresponding to the field programmable gate array chip, the queue module 32 may be configured to: obtain the group capacity of the hardware queue group based on the first number of the high-speed buses and the total number of the hardware queues; and evenly distribute all the hardware queues of the field programmable gate array chip to the first number of hardware queue groups based on the group capacity of the hardware queue group to obtain configured hardware queue groups corresponding to the field programmable gate array.

According to one or more embodiments of the present disclosure, the queue module 32 is further configured to: configure, through the control chip, the bandwidth speed limit of the hardware queue groups corresponding to the field programmable gate array chip; and/or the target high-speed buses respectively corresponding to the hardware queue groups.

According to one or more embodiments of the present disclosure, the transceiving module 31 is further configured to: obtain the corresponding target high-speed bus based on the port identifier of the smart network interface card. When receiving the at least two data sending requests sent through the high-speed buses by the server, the transceiving module 31 may be configured to: receive the at least two data sending requests sent through the target high-speed bus by the server.

The transceiving module 31, the queue module 32, and the communication module 33 are connected in sequence. The data sending apparatus 3 provided in this embodiment may perform the technical solutions of the above method embodiments, and implementation principles and technical effects thereof are similar, which will not be repeated here in this embodiment.

Figure 11:
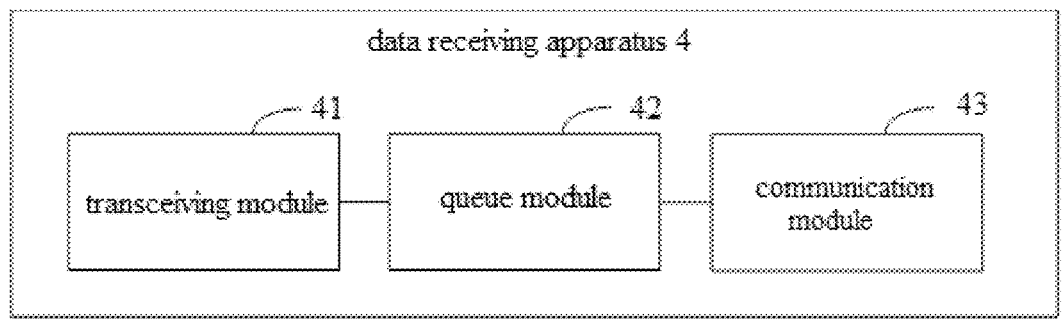
FIG. 11 is a structural block diagram of a data receiving apparatus according to an embodiment of the present disclosure.

Corresponding to the data receiving method in the above embodiment, FIG. 11 is a structural block diagram of a data receiving apparatus according to an embodiment of the present disclosure. For ease of illustration, only parts related to the embodiments of the present disclosure are shown. Referring to FIG. 11, exemplarily, a data receiving apparatus 4 is applied to a smart network interface card. The smart network interface card has bus ports of at least two high-speed buses. The smart network interface card communicates with a server through the high-speed buses. The data receiving apparatus 4 includes a transceiving module 41, a queue module 42, and a communication module 43.

The transceiving module 41 is configured to receive at least two data receiving requests sent by an external device through a network port, where the data receiving requests are used to request the smart network interface card to store message data sent by the external device in the server.

The queue module 42 is configured to determine a corresponding target hardware queue for each of the data receiving requests, where a hardware queue is used to communicate with the server through the high-speed bus, target hardware queues corresponding to the data receiving requests are distributed in at least two hardware queue groups, and the hardware queue groups are in one-to-one correspondence with the high-speed buses.

The communication module 43 is configured to communicate, by the target hardware queues, with the server through at least two corresponding high-speed buses at the same time, to send the message data to the server.

According to one or more embodiments of the present disclosure, a field programmable gate array chip is provided inside the smart network interface card, the field programmable gate array chip is connected to the high-speed buses and the network port and provides hardware queue groups in one-to-one correspondence with the high-speed buses, and the data receiving requests include a data identifier corresponding to the message data and a port identifier of the network port. The queue module 42 may be configured to: acquire second configuration information of the field programmable gate array chip, where the second configuration information is used to characterize a mapping relationship between data pairs and target hardware queues, where the data pair consists of a port identifier of a network port connected to the field programmable gate array chip and a data identifier; and obtain the target hardware queue based on processing of the second configuration information, and the data identifier and the port identifier of the network port in the data receiving request.

The transceiving module 41, the queue module 42, and the communication module 43 are connected in sequence. The data receiving apparatus 4 provided in this embodiment may perform the technical solutions of the above method embodiments, and implementation principles and technical effects thereof are similar, which will not be repeated here in this embodiment.

In a possible implementation, the transceiving module 41 in this embodiment may be equivalent to the communication module 33 in the embodiment shown in FIG. 10, and the communication module 43 in this embodiment may be equivalent to the transceiving module 31 in the embodiment shown in FIG. 10. Therefore, the data receiving apparatus in this embodiment may also be composed of a communication module, a queue module, and a transceiving module that are connected in sequence. The communication module is configured to receive at least two data receiving requests sent by an external device through a network port, where the data receiving requests are used to request the smart network interface card to store message data sent by the external device in the server. The queue module is configured to determine a corresponding target hardware queue for each of the data receiving requests, where a hardware queue is used to communicate with the server through the high-speed bus, target hardware queues corresponding to the data receiving requests are distributed in at least two hardware queue groups, and the hardware queue groups are in one-to-one correspondence with the high-speed buses. The transceiving module is configured to communicate, by the target hardware queues, with the server through at least two corresponding high-speed buses at the same time, to send the message data to the server.

Figure 12:
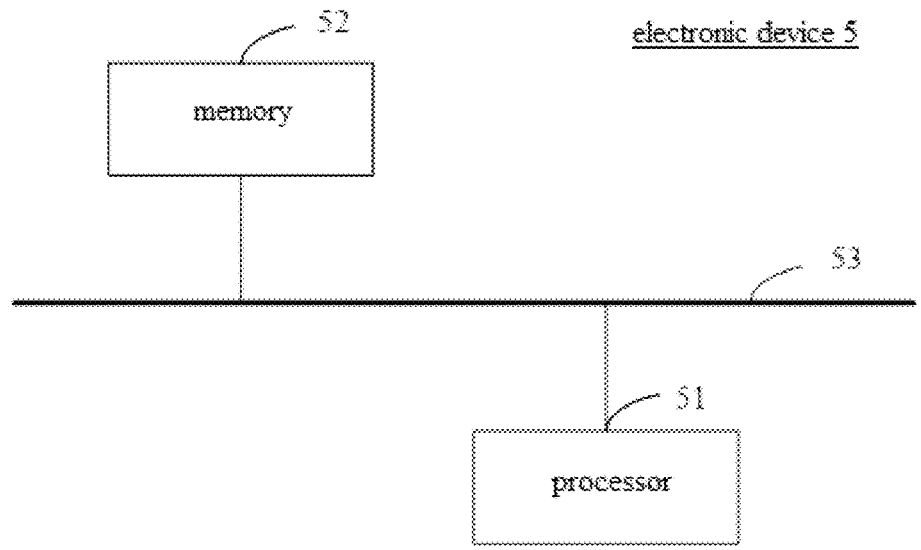
FIG. 12 is a schematic structural diagram of an electronic device according to an embodiment of the present disclosure.

FIG. 12 is a schematic structural diagram of an electronic device according to an embodiment of the present disclosure. As shown in FIG. 12, the electronic device 5 includes:
a processor 51, and a memory 52 communicatively connected to the processor 51;
where the memory 52 stores computer-executable instructions; and
the processor 51 executes the computer-executable instructions stored in the memory 52 to implement the data sending method in the embodiments shown in FIG. 2 to FIG. 7, or to implement the data receiving method in the embodiments shown in FIG. 8 to FIG. 9.

Optionally, the processor 51 and the memory 52 are connected through a bus 53.

For related description, reference may be made to corresponding description and effect of steps in the embodiments shown in FIG. 2 to FIG. 9 for understanding, which will not be repeated here.

An embodiment of the present disclosure provides a computer-readable storage medium. Computer-executable instructions are stored in the computer-readable storage medium, and when the computer-executable instructions are executed by a processor, the processor is configured to implement the data sending method in the embodiments shown in FIG. 2 to FIG. 7 of the present disclosure, or to implement the data receiving method in the embodiments shown in FIG. 8 to FIG. 9.

An embodiment of the present disclosure provides a computer program product, including a computer program. When the computer program is executed by a processor, the processor is configured to implement the data sending method in the embodiments shown in FIG. 2 to FIG. 7 of the present disclosure, or to implement the data receiving method in the embodiments shown in FIG. 8 to FIG. 9.

In order to implement the above embodiments, an embodiment of the present disclosure further provides an electronic device.

Figure 13:
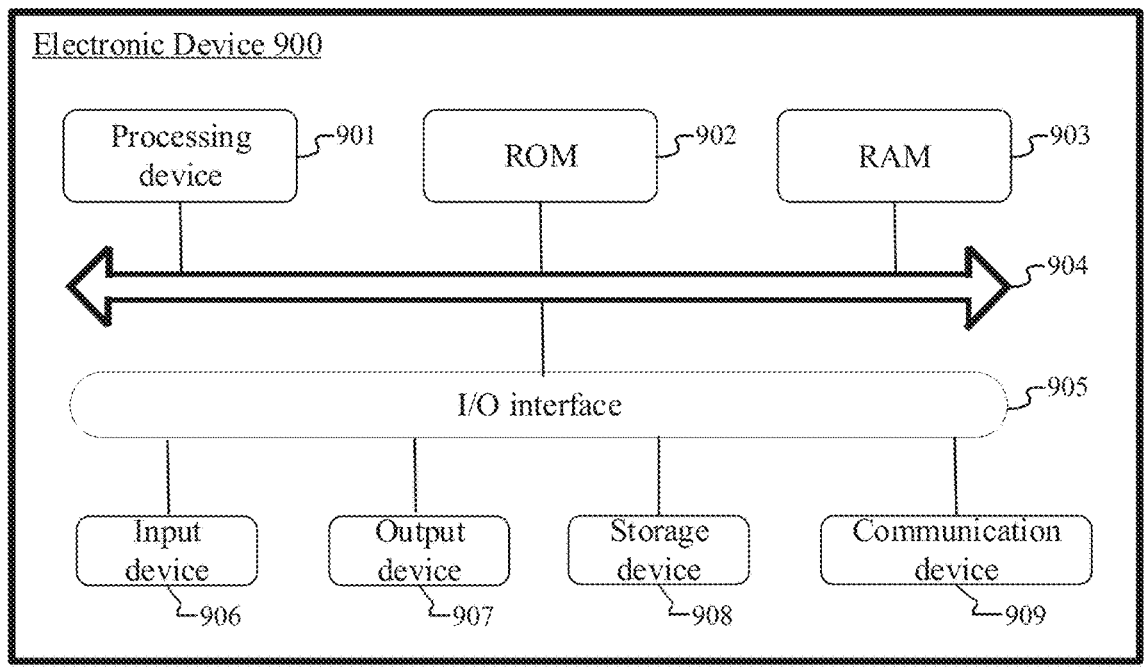
FIG. 13 is a schematic hardware structural diagram of an electronic device according to an embodiment of the present disclosure.

Referring to FIG. 13, it shows a schematic structural diagram of an electronic device 900 suitable for implementing an embodiment of the present disclosure, and the electronic device 900 may be a terminal device or a server. The terminal device may include, but is not limited to, mobile terminals such as mobile phones, notebook computers, digital broadcast receivers, personal digital assistants (abbreviated as PDA), tablet computers, portable multimedia players (abbreviated as PMP), vehicle-mounted terminals (such as vehicle-mounted navigation terminals), etc., and fixed terminals such as digital TV, desktop computers, etc. The electronic device shown in FIG. 13 is only an example, and should not bring any limitation to the functions and scope of use of the embodiments of the present disclosure.

As shown in FIG. 13, the electronic device 900 may include a processing apparatus (such as a central processing unit, a graphics processing unit, etc.) 901, which may execute various appropriate actions and processes according to a program stored in a read only memory (abbreviated as ROM) 902 or a program loaded from a storage device 908 into a random-access memory (abbreviated as RAM) 903. Various programs and data required for the operation of the electronic device 900 are also stored in the RAM 903. The processing device 901, the ROM 902, and the RAM 903 are connected to each other through a bus 904. An input/output (I/O) interface 905 is also connected to the bus 904.

Generally, the following devices may be connected to the I/O interface 905: an input device 906 including, for example, a touchscreen, a touchpad, a keyboard, a mouse, a camera, a microphone, an accelerometer, a gyroscope, etc.; an output device 907 including, for example, a liquid crystal display (abbreviated as LCD), a speaker, a vibrator, etc.; a storage device 908 including, for example, a magnetic tape, a hard disk, etc.; and a communication device 909. The communication device 909 may allow the electronic device 900 to perform wireless or wired communication with other devices to exchange data. Although FIG. 13 illustrates the electronic device 900 having various devices, it should be understood that not all of the illustrated devices are required to be implemented or provided. More or fewer devices may alternatively be implemented or provided.

In particular, according to an embodiment of the present disclosure, the processes described above with reference to the flowcharts may be implemented as a computer software program. For example, an embodiment of the present disclosure includes a computer program product, which includes a computer program carried on a computer-readable medium, where the computer program includes program codes for executing the methods shown in the flowcharts. In such an embodiment, the computer program may be downloaded and installed from a network through the communication device 909, or installed from the storage device 908, or installed from the ROM 902. When the computer program is executed by the processing device 901, the above functions defined in the methods of the embodiments of the present disclosure are executed.

It should be noted that the above computer-readable medium in the present disclosure may be a computer-readable signal medium or a computer-readable storage medium or any combination thereof. The computer-readable storage medium may be, for example, but not limited to, an electrical, magnetic, optical, electromagnetic, infrared, or semiconductor system, apparatus or device, or any combination thereof. More specific examples of the computer-readable storage medium may include, but are not limited to: an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program, and the program may be used by or in combination with an instruction execution system, apparatus or device. In the present disclosure, the computer-readable signal medium may include a data signal propagated in a baseband or as a part of a carrier, and computer-readable program codes are carried in the data signal. The propagated data signal may adopt many forms, including but not limited to an electromagnetic signal, an optical signal, or any suitable combination thereof. The computer-readable signal medium may also be any computer-readable medium other than the computer-readable storage medium. The computer-readable signal medium may send, propagate, or transmit a program used by or in combination with an instruction execution system, apparatus or device. The program codes contained on the computer-readable medium may be transmitted by any suitable medium, including, but not limited to, an electric wire, an optical cable, RF (radio frequency), etc., or any suitable combination thereof.

The above computer-readable medium may be included in the above electronic device, or may exist alone without being assembled into the electronic device.

The above computer-readable medium carries one or more programs, and when the one or more programs are executed by the electronic device, the electronic device is caused to execute the methods shown in the above embodiments.

Computer program codes for performing the operations of the present disclosure may be written in one or more programming languages or a combination thereof. The above programming languages include object-oriented programming languages, such as Java, Smalltalk, C++, and also include conventional procedural programming languages, such as the "C" language or similar programming languages. The program codes may be executed entirely on a user computer, partly on a user computer, as a stand-alone software package, partly on a user computer and partly on a remote computer, or entirely on a remote computer or a server. In the case of involving a remote computer, the remote computer may be connected to the user computer through any type of network, including a local area network (LAN for short) or a wide area network (WAN for short), or may be connected to an external computer (for example, via the Internet using an Internet service provider).

The flowcharts and block diagrams in the drawings illustrate the architecture, functions and operations of possible implementations of the system, method and computer program product according to various embodiments of the present disclosure. In this regard, each block in the flowcharts or block diagrams may represent a module, a program segment, or a part of codes, and the module, program segment, or part of codes contains one or more executable instructions for implementing a designated logical function. It should also be noted that in some alternative implementations, the functions marked in the blocks may also occur in an order different from that marked in the drawings. For example, two blocks shown in succession may actually be executed substantially in parallel, and they may sometimes be executed in the reverse order, depending on the functions involved. It should also be noted that each block in the block diagrams and/or flowcharts, and a combination of blocks in the block diagrams and/or flowcharts, may be implemented by a dedicated hardware-based system for executing designated functions or operations, or may be implemented by a combination of dedicated hardware and computer instructions.

The units or modules involved in the embodiments of the present disclosure may be implemented by software, and may also be implemented by hardware. Where a name of a unit or a module does not constitute a limitation on the unit in a certain case.

The functions described above herein may be executed, at least partially, by one or more hardware logic components. For example, without limitation, exemplary types of hardware logic components that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium that may contain or store a program for use by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In a first aspect, according to one or more embodiments of the present disclosure, a data sending method is provided. The method is applied to a smart network interface card. The smart network interface card has bus ports of at least two high-speed buses. The smart network interface card communicates with a server through the high-speed buses. The method includes:

receiving at least two data sending requests sent by the server through the high-speed buses, where the data sending requests are used to request the smart network interface card to send message data stored on a side of the server to an external device; determining a corresponding target hardware queue for each of the data sending requests, where a hardware queue is used to communicate with the server through the high-speed bus, target hardware queues corresponding to the data sending requests are distributed in at least two hardware queue groups, and the hardware queue groups are in one-to-one correspondence with the high-speed buses; and communicating, by the target hardware queues, with the server through at least two corresponding high-speed buses at the same time to obtain corresponding message data, and sending the corresponding message data to the external device.

According to one or more embodiments of the present disclosure, a field programmable gate array chip is provided inside the smart network interface card, the field programmable gate array chip is connected to the high-speed buses and provides the hardware queue groups in one-to-one correspondence with the high-speed buses, and the data sending requests include a data identifier corresponding to the message data and a bus identifier of a target high-speed bus. The determining the corresponding target hardware queue for each of the data sending requests includes: acquiring first configuration information of the field programmable gate array chip, where the first configuration information is used to characterize a mapping relationship between data pairs and target hardware queues, where the data pair consists of a bus identifier of a high-speed bus connected to the field programmable gate array chip and a data identifier; and obtaining the target hardware queue based on processing of the first configuration information, and the data identifier and the bus identifier of the target high-speed bus in the data sending request.

According to one or more embodiments of the present disclosure, the method further includes: generating, through the field programmable gate array chip, a data request task in response to the data sending request, and writing the data request task into the target hardware queues corresponding to the data sending requests in sequence. The communicating, by the target hardware queues, with the server through at least two corresponding high-speed buses at the same time to obtain the corresponding message data includes: asynchronously executing, by the target hardware queues of the field programmable gate array chip, the data request task in the queues to perform direct memory access to a memory of the server through the at least two high-speed buses at the same time, to obtain the message data corresponding to the data request task.

According to one or more embodiments of the present disclosure, the smart network interface card further includes a control chip connected to the field programmable gate array chip. The method further includes: initializing the field programmable gate array chip through the control chip to configure hardware queues in at least two hardware queue groups corresponding to the field programmable gate array chip.

According to one or more embodiments of the present disclosure, the initializing the field programmable gate array chip through the control chip to configure the hardware queues in the at least two hardware queue groups corresponding to the field programmable gate array chip includes: obtaining the group capacity of the hardware queue group based on the first number of the high-speed buses and the total number of the hardware queues; and evenly distributing all the hardware queues of the field programmable gate array chip to the first number of hardware queue groups based on the group capacity of the hardware queue group to obtain configured hardware queue groups corresponding to the field programmable gate array.

According to one or more embodiments of the present disclosure, the method further includes: configuring, through the control chip, the bandwidth speed limit of the hardware queue groups corresponding to the field programmable gate array chip; and/or the target high-speed buses respectively corresponding to the hardware queue groups.

According to one or more embodiments of the present disclosure, the method further includes: obtaining the corresponding target high-speed bus based on the port identifier of the smart network interface card. The receiving the at least two data sending requests sent by the server through the high-speed buses includes: receiving the at least two data sending requests sent by the server through the target high-speed bus.

In a second aspect, according to one or more embodiments of the present disclosure, a data receiving method is provided. The method is applied to a smart network interface card. The smart network interface card has bus ports of at least two high-speed buses. The smart network interface card communicates with a server through the high-speed buses. The method includes:

receiving at least two data receiving requests sent by an external device through a network port, where the data receiving requests are used to request the smart network interface card to store message data sent by the external device in the server; determining a corresponding target hardware queue for each of the data receiving requests, where a hardware queue is used to communicate with the server through the high-speed bus, target hardware queues corresponding to the data receiving requests are distributed in at least two hardware queue groups, and the hardware queue groups are in one-to-one correspondence with the high-speed buses; and communicating, by the target hardware queues, with the server through at least two corresponding high-speed buses at the same time, to send the message data to the server.

According to one or more embodiments of the present disclosure, a field programmable gate array chip is provided inside the smart network interface card, the field programmable gate array chip is connected to the high-speed buses and the network port and provides the hardware queue groups in one-to-one correspondence with the high-speed buses, and the data receiving requests include a data identifier corresponding to the message data and a port identifier of the network port. The determining the corresponding target hardware queue for each of the data receiving requests includes: acquiring second configuration information of the field programmable gate array chip, where the second configuration information is used to characterize a mapping relationship between data pairs and target hardware queues, where the data pair consists of a port identifier of a network port connected to the field programmable gate array chip and a data identifier; and obtaining the target hardware queue based on processing of the second configuration information, and the data identifier and the port identifier of the network port in the data receiving request.

According to one or more embodiments of the present disclosure, the method further includes: generating, through the field programmable gate array chip, a data sending task in response to the data receiving request, and writing the data sending task into the target hardware queues corresponding to the data receiving requests in sequence.

According to one or more embodiments of the present disclosure, the communicating, by the target hardware queues, with the server through at least two corresponding high-speed buses at the same time, to send the message data to the server includes: asynchronously executing, by the target hardware queues of the field programmable gate array chip, the data sending task in the queue to write the message data into the message buffer of the server through at least two high-speed buses at the same time.

According to one or more embodiments of the present disclosure, the smart network interface card further includes a control chip connected to the field programmable gate array chip. The method further includes: initializing the field programmable gate array chip through the control chip to configure the hardware queues in at least two hardware queue groups corresponding to the field programmable gate array chip.

According to one or more embodiments of the present disclosure, the initializing the field programmable gate array chip through the control chip to configure the hardware queues in the at least two hardware queue groups corresponding to the field programmable gate array chip includes: obtaining the group capacity of the hardware queue group based on the first number of the high-speed buses and the total number of the hardware queues; and evenly distributing all the hardware queues of the field programmable gate array chip to the first number of hardware queue groups based on the group capacity of the hardware queue group to obtain configured hardware queue groups corresponding to the field programmable gate array.

According to one or more embodiments of the present disclosure, the method further includes: configuring, through the control chip, the bandwidth speed limit of the hardware queue groups corresponding to the field programmable gate array chip; and/or the target high-speed buses respectively corresponding to the hardware queue groups.

In a third aspect, according to one or more embodiments of the present disclosure, a data sending apparatus is provided. The apparatus includes:

a transceiving module, configured to receive at least two data sending requests sent by the server through the high-speed buses, where the data sending requests are used to request the smart network interface card to send message data stored on a side of the server to an external device;

a queue module, configured to determine a corresponding target hardware queue for each of the data sending requests, where a hardware queue is used to communicate with the server through the high-speed bus, target hardware queues corresponding to the data sending requests are distributed in at least two hardware queue groups, and the hardware queue groups are in one-to-one correspondence with the high-speed buses; and a communication module, configured to communicate, by the target hardware queues, with the server through at least two corresponding high-speed buses at the same time to obtain corresponding message data, and send the corresponding message data to the external device.

According to one or more embodiments of the present disclosure, a field programmable gate array chip is provided inside the smart network interface card, the field programmable gate array chip is connected to the high-speed buses and provides the hardware queue groups in one-to-one correspondence with the high-speed buses, and the data sending requests include a data identifier corresponding to the message data and a bus identifier of a target high-speed bus. The queue module may be configured to: acquire first configuration information of the field programmable gate array chip, where the first configuration information is used to characterize a mapping relationship between data pairs and target hardware queues, where the data pair consists of a bus identifier of a high-speed bus connected to the field programmable gate array chip and a data identifier; and obtain the target hardware queue based on processing of the first configuration information, and the data identifier and the bus identifier of the target high-speed bus in the data sending request.

According to one or more embodiments of the present disclosure, the queue module is further configured to: generate, through the field programmable gate array chip, a data request task in response to the data sending request, and write the data request task into the target hardware queues corresponding to the data sending requests in sequence. The communication module may be configured to: asynchronously execute, by the target hardware queues of the field programmable gate array chip, the data request task in the queues to perform direct memory access to a memory of the server through the at least two high-speed buses at the same time, to obtain the message data corresponding to the data request task.

According to one or more embodiments of the present disclosure, the smart network interface card further includes a control chip connected to the field programmable gate array chip. The queue module may be configured to: initialize the field programmable gate array chip through the control chip to configure hardware queues in at least two hardware queue groups corresponding to the field programmable gate array chip.

According to one or more embodiments of the present disclosure, when initializing the field programmable gate array chip through the control chip to configure the hardware queues in the at least two hardware queue groups corresponding to the field programmable gate array chip, the queue module may be configured to: obtain the group capacity of the hardware queue group based on the first number of the high-speed buses and the total number of the hardware queues; and evenly distribute all the hardware queues of the field programmable gate array chip to the first number of hardware queue groups based on the group capacity of the hardware queue group to obtain configured hardware queue groups corresponding to the field programmable gate array.

According to one or more embodiments of the present disclosure, the queue module is further configured to: configure, through the control chip, the bandwidth speed limit of the hardware queue groups corresponding to the field programmable gate array chip; and/or the target high-speed buses respectively corresponding to the hardware queue groups.

According to one or more embodiments of the present disclosure, the transceiving module is further configured to: obtain the corresponding target high-speed bus based on the port identifier of the smart network interface card. When receiving the at least two data sending requests sent by the server through the high-speed buses, the transceiving module may be configured to: receive the at least two data sending requests sent by the server through the target high-speed bus.

In a fourth aspect, according to one or more embodiments of the present disclosure, a data receiving apparatus is provided. The apparatus includes:

a communication module, configured to receive at least two data receiving requests sent by an external device through a network port, where the data receiving requests are used to request the smart network interface card to store message data sent by the external device in the server;

a queue module, configured to determine a corresponding target hardware queue for each of the data receiving requests, where a hardware queue is used to communicate with the server through the high-speed bus, target hardware queues corresponding to the data receiving requests are distributed in at least two hardware queue groups, and the hardware queue groups are in one-to-one correspondence with the high-speed buses; and a transceiving module, configured to communicate, by the target hardware queues, with the server through at least two corresponding high-speed buses at the same time, to send the message data to the server.

According to one or more embodiments of the present disclosure, a field programmable gate array chip is provided inside the smart network interface card, the field programmable gate array chip is connected to the high-speed buses and the network port and provides the hardware queue groups in one-to-one correspondence with the high-speed buses, and the data receiving requests include a data identifier corresponding to the message data and a port identifier of the network port. The queue module may be configured to: acquire second configuration information of the field programmable gate array chip, where the second configuration information is used to characterize a mapping relationship between data pairs and target hardware queues, where the data pair consists of a port identifier of a network port connected to the field programmable gate array chip and a data identifier; and obtain the target hardware queue based on processing of the second configuration information, and the data identifier and the port identifier of the network port in the data receiving request.

In a fifth aspect, according to one or more embodiments of the present disclosure, an electronic device is provided. The electronic device includes: at least one processor and a memory;

where the memory stores computer-executable instructions; and the at least one processor executes the computer-executable instructions stored in the memory, so that the at least one processor executes the data sending method according to the above first aspect and various possible designs of the first aspect, or executes the data receiving method according to the above second aspect and various possible designs of the second aspect.

In a sixth aspect, according to one or more embodiments of the present disclosure, a computer-readable storage medium is provided. The computer-readable storage medium stores computer-executable instructions, and when the processor executes the computer-executable instructions, the processor is configured to implement the data sending method according to the above first aspect and various possible designs of the first aspect, or to implement the data receiving method according to the above second aspect and various possible designs of the second aspect.

In a seventh aspect, according to one or more embodiments of the present disclosure, a computer program product is provided, including a computer program. When the computer program is executed by a processor, the processor is configured to implement the data sending method according to the above first aspect and various possible designs of the first aspect, or to implement the data receiving method according to the above second aspect and various possible designs of the second aspect.

The above description only refers to preferred embodiments of the present disclosure and an explanation of the technical principles as applied. Those skilled in the art should understand that the disclosure scope involved in the present disclosure is not limited to the technical solutions formed by the specific combination of the above technical features, and should also cover other technical solutions formed by any combination of the above technical features or equivalent features thereof without departing from the above disclosure concept, for example, a technical solution formed by replacing the above features with the technical features with similar functions disclosed in the present disclosure (but not limited thereto).

In addition, although various operations are depicted in a specific order, this should not be understood as requiring these operations to be performed in the specific order shown or in a sequential order. Under certain circumstances, multitasking and parallel processing may be advantageous. Similarly, although several specific implementation details are included in the above discussion, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments individually or in any suitable sub-combination.

Although the subject matter has been described in a language specific to structural features and/or method logical actions, it should be understood that the subject matter defined in the appended claims is not necessarily limited to the specific features or actions described above. On the contrary, the specific features and actions described above are only example forms for implementing the claims.

The invention claimed is:

1. A data sending method, applied to a smart network interface card,
wherein the smart network interface card has bus ports of at least two buses, and the smart network interface card communicates with a server through the at least two buses, the method comprises:
receiving at least two data sending requests sent by the server through the at least two buses, wherein the at least two data sending requests are configured to request the smart network interface card to send message data stored on a side of the server to an external device;
determining a corresponding target hardware queue for each of the at least two data sending requests, wherein the corresponding target hardware queue is configured to communicate with the server through one of the at least two buses, target hardware queues corresponding to the at least two data sending requests are distributed in at least two hardware queue groups, and the at least two hardware queue groups are in one-to-one correspondence with the at least two buses; and
communicating, by the target hardware queues, with the server through the at least two buses at the same time to obtain corresponding message data, and sending the corresponding message data to the external device.

2. The method according to claim 1, wherein a field programmable gate array chip is provided inside the smart network interface card, the field programmable gate array chip is connected to the at least two buses and provides the at least two hardware queue groups in one-to-one correspondence with the at least two buses, and each of the at least two data sending requests comprises a data identifier corresponding to the message data and a bus identifier of a target bus; and
wherein the determining a corresponding target hardware queue for each of the at least two data sending requests comprises:
acquiring first configuration information of the field programmable gate array chip, wherein the first configuration information is used to characterize a mapping relationship between data pairs and target hardware queues, where the data pair consists of a bus identifier of a bus connected to the field programmable gate array chip and the data identifier; and
obtaining the target hardware queue based on processing of the first configuration information, and the data identifier and the bus identifier of the target bus in the data sending request.

3. The method according to claim 2, further comprising:
generating, through the field programmable gate array chip, a data request task in response to the at least two data sending requests, and writing the data request task into the target hardware queues corresponding to the at least two data sending requests in sequence; and
wherein the communicating, by the target hardware queues, with the server through the at least two buses at the same time to obtain corresponding message data comprises:
asynchronously executing, by the target hardware queues of the field programmable gate array chip, the data request task in the target hardware queues to perform direct memory access to a memory of the server through the at least two buses at the same time, to obtain the message data corresponding to the data request task.

4. The method according to claim 2, wherein the smart network interface card further comprises a control chip connected to the field programmable gate array chip, and the method further comprises:
initializing the field programmable gate array chip through the control chip to configure hardware queues in the at least two hardware queue groups corresponding to the field programmable gate array chip.

5. The method according to claim 4, wherein the initializing the field programmable gate array chip through the control chip to configure hardware queues in the at least two hardware queue groups corresponding to the field programmable gate array chip comprises:
   obtaining a group capacity of the hardware queue group based on a first number of the at least two buses and a total number of the hardware queues; and
   evenly distributing all the hardware queues of the field programmable gate array chip to the first number of the at least two hardware queue groups based on the group capacity of the hardware queue group to obtain configured hardware queue groups corresponding to the field programmable gate array.

6. The method according to claim 4, further comprising:
   configuring, through the control chip, a bandwidth speed limit of the at least two hardware queue groups corresponding to the field programmable gate array chip; and/or target buses respectively corresponding to the at least two hardware queue groups.

7. The method according to claim 1, further comprising:
   obtaining a corresponding target bus based on a port identifier of the smart network interface card; and
   wherein the receiving at least two data sending requests sent by the server through the at least two buses comprises:
   receiving the at least two data sending requests sent by the server through the target bus.

8. A data receiving method, applied to a smart network interface card, wherein the smart network interface card has bus ports of at least two buses, and the smart network interface card communicates with a server through the at least two buses, the method comprises:
   receiving at least two data receiving requests sent by an external device through a network port, wherein the at least two data receiving requests are configured to request the smart network interface card to store message data sent by the external device in the server;
   determining a corresponding target hardware queue for each of the at least two data receiving requests, wherein the corresponding target hardware queue is configured to communicate with the server through one of the at least two buses, target hardware queues corresponding to the at least two data receiving requests are distributed in at least two hardware queue groups, and the at least two hardware queue groups are in one-to-one correspondence with the at least two buses; and
   communicating, by the target hardware queues, with the server the at least two buses at the same time, to send the message data to the server.

9. The method according to claim 8, wherein a field programmable gate array chip is provided inside the smart network interface card, the field programmable gate array chip is connected to the at least two buses and the network port and provides the at least two hardware queue groups in one-to-one correspondence with the at least two buses, and each of the at least two data receiving requests comprises a data identifier corresponding to the message data and a port identifier of the network port; and
   wherein the determining a corresponding target hardware queue for each of the at least two data receiving requests comprises:
   acquiring second configuration information of the field programmable gate array chip, wherein the second configuration information is used to characterize a mapping relationship between data pairs and target hardware queues, where the data pair consists of the port identifier of the network port connected to the field programmable gate array chip and the data identifier; and
   obtaining the target hardware queue based on processing of the second configuration information, and the data identifier and the port identifier of the network port in the data receiving request.

10. An electronic device, comprising: a processor and a memory; wherein
   the memory stores computer-executable instructions; and the processor executes the computer-executable instructions stored in the memory so as to perform a data sending method or a data receiving method applied to a smart network interface card,
   wherein the smart network interface card has bus ports of at least two buses, and the smart network interface card communicates with a server through the at least two buses,
   the data sending method comprises:
   receiving at least two data sending requests sent by the server through the at least two buses, wherein the at least two data sending requests are configured to request the smart network interface card to send message data stored on a side of the server to an external device,
   determining a corresponding target hardware queue for each of the at least two data sending requests, wherein the corresponding target hardware queue is configured to communicate with the server through one of the at least two buses, target hardware queues corresponding to the at least two data sending requests are distributed in at least two hardware queue groups, and the at least two hardware queue groups are in one-to-one correspondence with the at least two buses, and
   communicating, by the target hardware queues, with the server through the at least two buses at the same time to obtain corresponding message data, and sending the corresponding message data to the external device;
   the data receiving method comprises:
   receiving at least two data receiving requests sent by an external device through a network port, wherein the at least two data receiving requests are configured to request the smart network interface card to store message data sent by the external device in the server;
   determining a corresponding target hardware queue for each of the at least two data receiving requests, wherein the corresponding target hardware queue is configured to communicate with the server through one of the at least two buses, target hardware queues corresponding to the at least two data receiving requests are distributed in at least two hardware queue groups, and the at least two hardware queue groups are in one-to-one correspondence with the at least two buses, and
   communicating, by the target hardware queues, with the server through the at least two buses at the same time, to send the message data to the server.

11. The electronic device according to claim 10, wherein a field programmable gate array chip is provided inside the smart network interface card, the field programmable gate array chip is connected to the highspeed buses and provides the at least two hardware queue groups in one-to-one correspondence with the at least two buses, and each of the at least two data sending requests comprises a data identifier corresponding to the message data and a bus identifier of a target bus; and wherein in the data sending method, the determining a corresponding target hardware queue for each of the at least two data sending requests comprises:

acquiring first configuration information of the field programmable gate array chip, wherein the first configuration information is used to characterize a mapping relationship between data pairs and target hardware queues, where the data pair consists of a bus identifier of a bus connected to the field programmable gate array chip and the data identifier; and obtaining the target hardware queue based on processing of the first configuration information, and the data identifier and the bus identifier of the target bus in the data sending request.

12. The electronic device according to claim 11, wherein the data sending method further comprises:

generating, through the field programmable gate array chip, a data request task in response to the data sending request, and writing the data request task into the target hardware queues corresponding to the at least two data sending requests in sequence; and wherein the communicating, by the target hardware queues, with the server through the at least two buses at the same time to obtain corresponding message data comprises:

asynchronously executing, by the target hardware queues of the field programmable gate array chip, the data request task in the target hardware queues to perform direct memory access to a memory of the server through the at least two buses at the same time, to obtain the message data corresponding to the data request task.

13. The electronic device according to claim 11, wherein the smart network interface card further comprises a control chip connected to the field programmable gate array chip, and the data sending method further comprises:

initializing the field programmable gate array chip through the control chip to configure hardware queues in the at least two hardware queue groups corresponding to the field programmable gate array chip.

14. The electronic device according to claim 13, wherein in the data sending method, the initializing the field programmable gate array chip through the control chip to configure hardware queues in the at least two hardware queue groups corresponding to the field programmable gate array chip comprises:

obtaining a group capacity of the hardware queue group based on a first number of the buses and a total number of the hardware queues; and evenly distributing all the hardware queues of the field programmable gate array chip to the first number of the at least two hardware queue groups based on the group capacity of the hardware queue group to obtain configured hardware queue groups corresponding to the field programmable gate array.

15. The electronic device according to claim 13, wherein the data sending method further comprises:

configuring, through the control chip, a bandwidth speed limit of the at least two hardware queue groups corresponding to the field programmable gate array chip; and/or target buses respectively corresponding to the at least two hardware queue groups.

16. The electronic device according to claim 10, wherein the data sending method further comprises:

obtaining a corresponding target bus based on a port identifier of the smart network interface card; and wherein the receiving at least two data sending requests sent by the server through the at least two buses comprises:

receiving the at least two data sending requests sent by the server through the target bus.

17. The electronic device according to claim 10, wherein a field programmable gate array chip is provided inside the smart network interface card, the field programmable gate array chip is connected to the highspeed buses and the network port and provides the at least two hardware queue groups in one-to-one correspondence with the at least two buses, and each of the at least two data receiving requests comprises a data identifier corresponding to the message data and a port identifier of the network port; and wherein in the data receiving method, the determining a corresponding target hardware queue for each of the at least two data receiving requests comprises:

acquiring second configuration information of the field programmable gate array chip, wherein the second configuration information is used to characterize a mapping relationship between data pairs and target hardware queues, where the data pair consists of a port identifier of the network port connected to the field programmable gate array chip and the data identifier; and obtaining the target hardware queue based on processing of the second configuration information, and the data identifier and the port identifier of the network port in the data receiving request.

\* \* \* \* \*